United States Patent [19]

Jenkins et al.

[11] Patent Number: 4,813,453

[45] Date of Patent: Mar. 21, 1989

[54] VEHICLE FUEL TANK VAPOR RECOVERY SYSTEM

[75] Inventors: Patrick A. Jenkins; John A. Aubel, both of Decatur, Ill.

[73] Assignee: Borg-Warner Automotive, Inc., Troy, Mich.

[21] Appl. No.: 40,675

[22] Filed: Apr. 21, 1987

[51] Int. Cl.[4] .................. B01D 53/04; B01D 53/14; B65D 90/28; F16K 24/04

[52] U.S. Cl. .................. 137/588; 220/85 VR; 220/85 VS; 220/86 R

[58] Field of Search ................ 137/583, 587, 588; 220/85 VR, 85 VS, 86 R, DIG. 33

[56] References Cited

U.S. PATENT DOCUMENTS

| | | | |
|---|---|---|---|
| 1,529,187 | 3/1925 | Keilholtz | 137/587 |
| 3,730,216 | 5/1973 | Arnett et al. | 137/588 |
| 3,749,124 | 7/1973 | Andres | 137/587 |
| 3,834,412 | 9/1974 | Fannin | 137/588 X |
| 3,854,911 | 12/1974 | Walker | 220/85 VS X |
| 3,884,204 | 5/1975 | Krautwurst et al. | 220/85 VR X |
| 3,907,153 | 9/1975 | Mutty | 220/86 R |
| 4,077,429 | 3/1978 | Kimball | 137/588 |
| 4,300,699 | 11/1981 | Anhegger | 220/86 R |
| 4,394,925 | 7/1983 | Rump et al. | 220/86 R |
| 4,552,175 | 11/1985 | Schiemann | 137/587 X |
| 4,573,694 | 3/1986 | Goto et al. | 220/86 R X |
| 4,630,749 | 12/1986 | Armstrong et al. | 220/86 R |
| 4,651,889 | 3/1987 | Uranishi et al. | 137/588 X |
| 4,659,346 | 4/1987 | Uranishi et al. | 137/588 X |
| 4,690,293 | 9/1987 | Uranishi et al. | 220/86 R |
| 4,701,198 | 10/1987 | Uranishi | 137/587 X |

Primary Examiner—John Rivell
Attorney, Agent, or Firm—James A. Geppert; John W. Harbst

[57] ABSTRACT

A fuel vapor recovery system wherein the physical installation and removal of the sealant member or gas cap is the activator of the system. The present invention offers a valve assembly which is mounted in the fuel filler tube and is positionally responsive to the presence or removal of the closure member assembly. The valve assembly of the present invention is disposed in combination with a vapor vent line leading to a fuel vapor canister. Broadly stated, the valve assembly includes first and second annular seals disposed on opposite sides of the vent port. The first seal blocks or prevents communication between the atmosphere and the fuel tank interior when the gas cap is removed. The second seal permits communication between the vapor vent and the fuel tank interior when the gas cap is removed from the open ended filler tube and blocks communication between the fuel tank's interior and the vent port when the cap assembly is reinstalled.

40 Claims, 2 Drawing Sheets

VEHICLE FUEL TANK VAPOR RECOVERY SYSTEM

FIELD OF THE INVENTION

The present invention relates to fuel vapor recovery systems for vehicles.

BACKGROUND OF THE INVENTION

Evaporative loses of hydrocarbons from motor fuel tanks contribute significantly to the unburned hydrocarbons emitted to the atmosphere. In 1991, the Environmental Protection Agency plans to require each vehicle manufacturer to provide an on-board method of recovering fuel vapors during a fuel refilling process. For safety reasons, such method must also provide for closing the vapor recovery line after completing the refueling process to prevent fuel from escaping during a collision or rollover. Automobile manufacturers desire, of course, to effect these ends with minimum changes to the vehicle and minimum changes to the customary refueling sequence.

SUMMARY OF THE INVENTION

In view of the above, and in accordance with the present invention, there is provided a fuel vapor recovery system which allows the fuel tank filler neck to be sealed during the fill phase of operation such that vapors generated during the fill phase can be directed to an evaporative control canister.

With the present invention, the physical installation and removal of the sealant member or gas cap is the activator of the system. More specifically, the present invention offers a valve assembly which is mounted in the fuel filler tube and is positionally responsive to the presence or removal of the sealant member or gas cap. The valve assembly of the present invention is disposed in combination with a vapor vent line leading to a fuel vapor canister. Broadly stated, the valve assembly includes first and second sealant means disposed on opposite sides of the vapor vent port. The first sealant means blocks or prevents communication between the atmosphere and the interior of the fuel tank when the gas cap is removed and the fuel nozzle is disposed in the filler tube. The second sealant means permits communication between the unrestricted vent port and the fuel tank interior when the gas cap or closure means is removed from the open ended filler tube and blocks communication between the fuel tank's interior and the vapor vent when the cap assembly is reinstalled. By such construction, the valve assembly of the present invention is capable of controlling vapor passage from the tank as a function of gas cap disposition.

Accordingly, a primary object of this invention is to improve collection of fuel vapor emissions generated from refueling a vehicle's fuel supply system while maintaining the same customer perception in the refueling sequence, maximizing the safety aspect in potential collision conditions, and minimizing vehicle changes.

Another object of this invention is the provision of a fuel vapor recovery means which controls vapor escapement from the tank as a function of the filler cap's disposition.

A further object of this invention is to provide a vapor vent valve assembly which includes a positionally responsive valve arrangement which responds to filler cap disposition.

BRIEF DESCRIPTION OF THE DRAWINGS

Having in mind the above objects and other attendant advantages that would be evident from an understanding of this disclosure, the invention comprises the devices, combinations and arrangement of parts as illustrated in the presently preferred forms of the invention which are hereinafter set forth in detail to enable those skilled in the art to readily understand the function, operation, construction and advantages of same when read in conjunction with the accompanying drawings in which.

DETAILED DESCRIPTION OF THE PRESENT INVENTION

Figure 1:
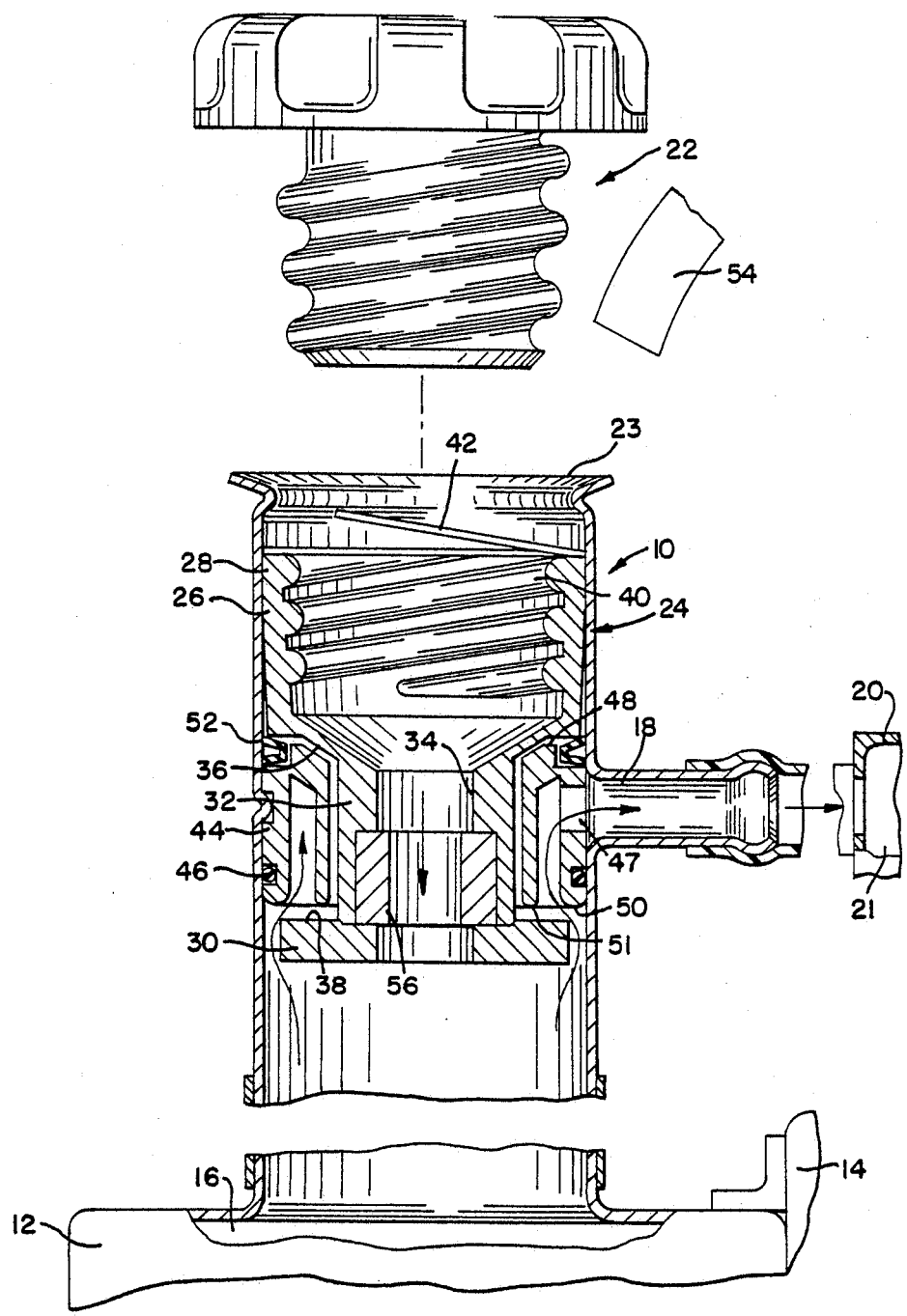
FIG. 1 is a cross-sectional view of one embodiment of a fuel vapor recovery valve assembly which incorporates the teachings of the present invention.

Referring now to the drawings, FIG. 1 illustrates a fuel filler system including an open ended fuel tank filler tube 10 leading from and connected to a fuel tank 12 carried by a vehicle 14. The fuel tank 12 has an interior fuel space 16 into which tube 10, ultimately, opens. The filler tube 10 is provided with an unrestricted vent port 18 which permits communication between the interior space 16 of tank 12 and a vapor collection canister 20 sized to be easily located on the vehicle. The canister may be of a conventional configuration having an interior volume or cavity 21 filled at least in part with an active vapor absorbing material such as activated charcoal. A threaded, ratchet type seal cap assembly or closure member 22 is provided for opening and sealing off or closing the open end 23 of the filler tube depending on the disposition of the cap assembly.

The present invention relates to the provision of a positionally responsive operative assembly 24 disposed in the interior of the filler neck 10 in combination with the vent port 18 for controlling the escapement of fuel vapors during a fuel filling process. One salient feature of this invention being that the operative means for controlling fuel vapor escapement from the fuel tank operates as a function of the filler cap disposition.

The operative assembly 24 includes an elongated spool like member or body 26 non-rotatably arranged in the filler tube 10 for axial endwise displacement. In the embodiment illustrated in FIG. 1, member 26 includes end portions 28 and 30 joined by a center section 32 and defines a central or axial bore 34 extending therethrough. The center section 32 has a smaller diameter than the two end portions 28 and 30. As a result of the different diameter portions, a first shoulder or seat 36 is established between end section 28 and center section 32. A second shoulder or seat 38 is established between end section 30 and center section 32. The bore extending through the first section 28 is enlarged and includes a series of internal threads or elements 40 which are adapted to cooperate and interengage with a threaded portion of closure cap assembly 22. By such construction, when the cap 22 is rotated with respect to the operative assembly 24, the member or body 26 will move endwise in one direction or another depending on the direction of rotation imparted to the cap assembly 22.

In the illustrated embodiment, the body or member 26 is normally urged in an axial direction away from the open end of filler tube 10 by a resilient member or spring 42. As such, when the sealing cap assembly 22 is removed from threaded engagement with the operative assembly during the fuel filling process, member 26 is automatically moved away from the open end of the filler tube under the influence of the resilient means 42.

Fixedly arranged about the valve member 24, intermediate flanges or seats 36 and 38, is a suitably slotted and generally cylindrical ring-like member 44. The ring-like member 44 includes suitable sealant means 46 which may be disposed between the outer surface of member 44 and the inner surface of the filler tube 10 in such a manner that a sealing relationship is maintained therebetween. The ring-like member further includes a radial aperture or port 47 which opens to the unrestricted vent opening 18 provided in the filler tube 10. The ring-like member 44 also includes axially spaced flanges or seats 48, 50 and 51. As illustrated, flange or seat 48 is disposed on one side of opening 18 while flanges or seats 50, 51 are disposed on the opposite side of opening 18. A seal ring 52 may be disposed on one or both of the flanges 48 and 50. The spaced flanges or seats 48, 50, and 51 on the ring-like member selectively cooperate with the shoulders or flanges 36, 38, respectively, on the movable body 24 to define first and second annular sealant means.

The diameter of the bore or aperture 34 extending through the fuel tank nozzle receptacle assembly 24 is large enough to accommodate a fuel pump nozzle 54 during a fuel filling process. In this embodiment, bore 34 is provided with suitable sealant means 56. The sealant means 56 snugly fits about the pump nozzle inserted therethrough for preventing vapor escapement around the pump nozzle during the fuel filling process.

Figure 2:
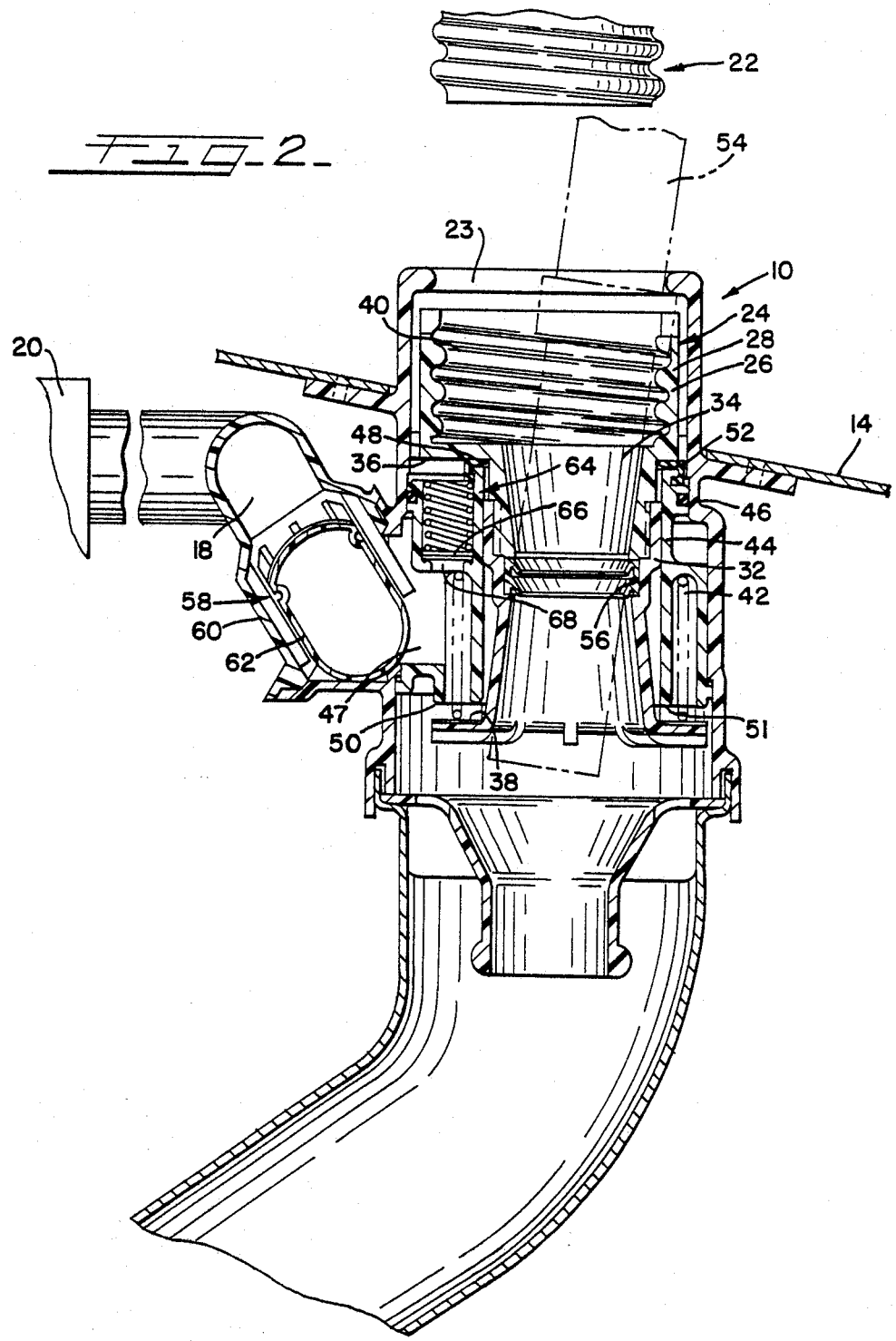
FIG. 2 is a cross-sectional view of a second embodiment of a fuel vapor recovery valve assembly incorporating the teachings of this invention.

In the second embodiment of the invention illustrated in FIG. 2, those parts which serve substantially the same function or are similar to those in FIG. 1 are identified with like reference numerals. In this embodiment, operative means 58 are provided for preventing liquid fuel from entering vent port 18 and being delivered to the canister 20. Such operative means includes a housing and slideable valve combination. More specifically, a housing 60 including a vent port 18 leading to canister 20 is adapted to receive the vapors exiting aperture 47 on ring-like member 44. Interposed between aperture 47 and exit port 18 is a floating member which rises in response to liquid fuel levels. As will be readily understood, the floating member or valve 62 may be removed from the position shown in FIG. 2 in response to rising fuel levels and linearly moves such that it seats and seals against housing 60 to prevent the escapement of liquid fuel into the exit port 18. When the fuel level falls, the valve member 62 will respond accordingly.

For safety purposes, a pressure or safety release valve 64 may also be provided in combination with the valve assembly of the present invention. In its preferred form, the pressure relief valve 64 includes a resiliently biased member 66 adapted to normally close a fuel exit port 68 provided in the ring-like member 44.

A refueling vapor recovery system constructed in accordance with either embodiment will essentially operate in the following manner. As will be understood, the physical installation and removal of the sealant cap assembly 22 is the activator of the system. In a fuel refilling process, and upon removal of the closure member or cap 22, the internally threaded member or body 26, which is prevented from turning with the cap 22, will be automatically displaced endwise within the filler tube 10 to the limit of its travel. That is, threaded member 26 will be linearly displaced downward (as seen in the drawings) until shoulder 36 contacts the stationary upper seal face or seat 48 of the stationary ring-like member 44. In such position, the shoulder 36 and the seat 48 or sealant means 52 on the ring-like member cooperate to establish an annular sealant means disposed on one side of the vent port to prevent vapor escapement past movable body 26 to atmosphere. In the illustrated embodiment in FIG. 1, sealant member 52 also provides a seal between ring-like member 44 and inner surfaces of filler tube 10 preventing the escapement of fuel vapor therepast. Because of the linear displacement of member 26, a vapor flowpath is established between the lower seat or sealface 50 on the ring-like member and the other shoulder or flange 38 on the movable member 26. This flowpath permits communication between the interior 16 of the fuel tank and the vent port 18 leading to the canister 20. As such, vapor is free to flow through the valve area to the canister 20. Because a mechanical seal occurs on the outside diameter of the pump nozzle, vapor escapement may be controlled through the vent port 18 by the disposition of body member 26. Moreover, and because the valve assembly 24 is responsive to movement of the gas cap or sealant member 22, the opening of the vapor path to canister 20 is effected before or prior to the seal cap assembly 22 breaking the seal to atmosphere. By such construction, tank vapors may be "burped" prior to removing the gas cap thus avoiding the historic "hiss" or spit back of fuel.

As the fuel rises and covers the pump nozzle 54, a normal end-of-fill shut off should occur. Liquid could continue to be pumped if the automatic nozzle shut off fails. If the fuel rises sufficiently, the floating valve assembly 58 will be influenced by the rising fuel level. More specifically, if the fuel rises sufficiently, the floating member 62 will be linearly displaced into a sealing engagement with the housing 60 to prevent liquid fuel from being delivered into the vent port 18. Once the operative valve means 58 closes off the vent port 18 and if fuel is continually pumped into the tank 12 a pressure rise in the tank will result. When the pressure rise exceeds the predetermined value set by the check valve 64, the valve 64 will open. Thus, liquid will be released to atmosphere at the filler neck location which will alert the customer to a nozzle malfunction and prompt a manual shut off.

The removal of the pump nozzle after filling and the reinstallation of the closure assembly 22 affects linear displacement of the operative assembly 24 and seals the vent port 18 and canister 20 from communication with the fuel tank interior 16. That is, the combined interengagement of the threaded elements on gas cap assembly 22 and member 26 will, understandably, cause linear displacement of body member against the action of the resilient means 42. Such displacement causes shoulder or seat 38 on valve member 26 to sealingly engage with seats or flanges 50 and 51 on the annular ring-like member 44. Because the second annular seal is disposed on the opposite side of the vent port, a second annular seal is established therebetween. As such, the vent 18 and canister 20 are closed or sealed off from communication with the interior 16 of the gas tank.

The design of this system is such that all the valving mechanisms are in-board of the fill neck housing. This results in an impact resistant design whose integrity is maintained as long as the gas cap assembly remains in position. Even in the event of the operative valve means 58 being sheared off, the fuel tank environment remains sealed to atmosphere by the operative valve arrangement 24. The net result is a system that is mechanical in nature which minimizes changes to the vehicle, provides minimal changes to the customer's refueling sequence, and maximizes integrity under potential collision situations.

Thus, there has been provided a VEHICLE FUEL TANK VAPOR RECOVERY SYSTEM which fully satisfies the aims, objectives, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described our invention, what we claim is:

1. A fuel filler system for an automobile vehicle comprising:
   a fuel tank;
   an open ended fuel filler tube connected to the tank and having a vapor vent leading to a canister, the open end of said filler tube closed by a removable threaded filler cap: and
   operative means having internal threads cooperating with said filler cap threads for reciprocable movement in said filler tube in combination with said vapor vent for selectively preventing fuel vapors from passing from said tank as a function of a filler cap disposition.

2. The invention according to claim 1 including annular sealant means and an inner seal on said operative means, said annular sealant means acting to prevent the passage of vapors to the atmosphere when the cap is removed and a filler nozzle engages said inner seal.

3. A fuel filler system for an automobile vehicle comprising:
   a fuel tank;
   an open ended fuel filler tube connected to the tank and having a vapor vent leading to a canister, the open end of said filler tube being closed by a removable threaded filler cap; and
   operative means cooperating with said filler cap for reciprocable movement in said filler tube in combination with said vapor vent for selectively preventing fuel vapors from passing from said tank as a function of filler cap disposition, said operative means including an apertured body adapted to receive a fuel pump nozzle with sealant means for preventing vapor escapement around said pump nozzle, annular sealant means disposed adjacent said vapor vent, said annular sealant means permitting vapors to be exhausted from the fuel tank through said vapor vent when the filler cap is removed from the filler tube and preventing vapors from being exhausted from the fuel tank when the filler cap closes the filler tube.

4. A fuel filler system for an automobile vehicle comprising:
   a fuel tank;
   an open ended fuel filler tube connected to the tank and having a vapor vent leading to a canister, the open end of said filler tube being closed by a removable threaded filler cap; and
   operative means including an apertured body adapted to receive a fuel pump nozzle disposed in said filler tube in combination with said vapor vent for selectively preventing fuel vapors from passing from said tank as a function of filler cap disposition, sealant means in said body for preventing vapor escapement around said pump nozzle, said apertured body being prevented from rotating and adapted for endwise displacement in said filler tube between first and second positions, and annular sealant means disposed adjacent said vapor vent permitting vapors to be exhausted from the fuel tank through said vapor vent when the filler cap is removed from the filler tube and preventing vapors from being exhausted from the fuel tank when the filler cap closes the filler tube.

5. The invention of claim 4 wherein said apertured body includes internal threading adapted to cooperate with said filler cap.

6. The invention according to claim 4 wherein said operative means further includes an apertured ring opening to said vapor vent and having a pair of axially spaced flanges, said apertured body further including axially spaced seal surfaces arranged to cooperate with said flanges to define first and second annular sealant means.

7. The invention according to claim 6 wherein said apertured body automatically moves from one position to another when the filler cap is removed under the influence of resilient biasing means.

8. The invention according to claim 6 wherein one of said flanges is defined by a resilient seal ring.

9. The invention according to claim 4 wherein said operative means includes valve assembly means disposed between said apertured body and said canister for preventing liquid fuel from being delivered to said canister.

10. In combination with a fuel tank having a filler neck adapted to be opened or closed by a closure member, and an apparatus for controlling the passage of fuel vapors from the fuel tank during a filling process, said apparatus comprising:
    an air vent provided in said filler neck and connected to a storage canister, and
    a fuel tank nozzle receptacle assembly arranged in said filler neck to sealingly surround a pump nozzle inserted into said filler neck and through said receptacle assembly and including a nonrotatable apertured body arranged in said filler neck for endwise displacement between first and second positions, and means disposed in combination with said air vent for controlling vapor pressure from said tank as a function of the closure member disposition including first and second annular sealant means disposed on opposite sides of said air vent.

11. The apparatus of claim 10 where said apertured body includes sealant means arranged to snugly fit about said pump nozzle inserted therethrough.

12. The apparatus of claim 10 wherein said nozzle receptacle assembly includes a ring-like member opening to and having flanges disposed on opposite sides of said air vent, said flanges being adapted to cooperate with seal surfaces on said apertured body for controlling vapor escapement from said fuel tank.

13. The apparatus according to claim 12 wherein said ring-like member is sealingly disposed in said filler neck.

14. The apparatus according to claim 12 wherein at least one of said flanges is defined by a resilient seal ring.

15. The apparatus of claim 10 wherein a portion of said apertured body threadably accommodates said closure member.

16. The apparatus of claim 10 wherein said apparatus further includes means for automatically moving said apertured body from one position to another in response to the closure member opening said filler neck.

17. The apparatus of claim 16 wherein said automatic moving means includes resilient means for continually applying a biasing force against said apertured body.

18. In combination with a fuel tank having an open ended filler tube, filler tube closure means for blocking communication between the fuel tank interior and exterior, at least one unrestricted vent port for communicating fuel vapors from the fuel tank interior to a canister, and an apparatus for controlling vapor loss from said fuel tank, said apparatus comprising:
a movable body disposed in said filler tube and having a first movable seal surface; and operative means cooperating with said movable seal surface for blocking communication between said unrestricted vent port and the interior of said fuel tank when said closure means is arranged to close the open of said filler tube and
permitting communication between said unrestricted vent port and said fuel tank interior when the closure means is removed from the open ended filler tube, said operative means including a fixed annular flange disposed on one side of said unrestricted vent port for sealing engagement with a movable seal surface, and a second relatively fixed annular flange disposed on the other side of said unrestricted vent port for sealing engagement with another movable seal surface.

19. The apparatus of claim 18 wherein said fixed annular flange is part of an annular ring fixedly accommodated and sealed within said filler tube.

20. The apparatus of claim 18 wherein at least one of said relatively fixed annular flanges is a seal lip carried by said annular ring.

21. In combination with a fuel tank having an open ended filler tube, filler tube closure means for blocking communication between the fuel tank interior and exterior, at least one unrestricted vent port for communicating fuel vapors from the fuel tank interior to a canister, and an apparatus for controlling vapor loss from said fuel tank, said apparatus comprising:
operative means for blocking communication between said unrestricted vent port and the interior of said fuel tank when said closure means is arranged to close the open end of said filler tube and including a fixed annular flange disposed on one side of said unrestricted vent port for sealing engagement with a movable seal surface, said movable seal surface being arranged on a movable body disposed in said filler tube permitting communication between said unrestricted vent port and said fuel tank interior when the closure means is removed from the open ended filler tube, and a second movable seal surface on said movable body.

22. The apparatus of claim 21 wherein said movable body is adapted for endwise movement in said filler neck between first and second positions.

23. The apparatus of claim 21 wherein said movable body is biased toward one position under the influence of resilient means.

24. In combination with a fuel tank having an open ended filler tube, filler tube closure means for blocking communication between the fuel tank interior and exterior, at least one unrestricted vent port for communicating fuel vapors from the fuel tank interior to a canister, and an apparatus for controlling vapor from said fuel tank, said apparatus comprising:
operative means for blocking communication between said unrestricted vent port and the interior of said fuel tank when said closure means is arranged to close the open end of said filler tube and including a fixed annular flange disposed on one side of said unrestricted vent port for sealing engagement with a movable seal surface, said movable seal surface being arranged on a movable body disposed in said filler tube and permitting communication between said unrestricted vent port and said fuel tank interior when the closure means is removed from the open ended filler tube, said movable body being adapted for endwise movement in said filler tube between first and second positions and includes a threaded portion which engages a threaded portion on said filler tube closure means, the engagement between said threaded portions causing the endwise displacement of said movable body in said filler tube.

25. In combination with a fluid container having a filler neck defining an opening through which fluid is admitted into the container, rotatable closure means for closing said opening, vapor ventilation means including a nonrestricted vent port leading from said filler neck, and an apparatus for controlling vapor loss from said container, said apparatus comprising:
positionally responsive means arranged in said opening and including a movable member arranged in combination with said vent port for controlling fuel vapor flow from said container as a function of said closure means disposition, said movable member including a spool-like body having axially spaced oppositely facing first and second shoulders and an axially extending opening therethrough.

26. The apparatus of claim 25 wherein said closing means said spool-like body have interengaging elements which when said closing means is rotated in one direction, causes said positionally responsive means to close off said vapor ventilation means from said container and which, when said closing means is rotated in an opposite direction, allows said vapor ventilation means to communicate with said fluid container.

27. The apparatus of claim 25 wherein said positionally responsive means further includes a ring-like member disposed between said first and second shoulders of said movable member.

28. The apparatus of claim 27 wherein said ring-like member includes first and second flanges which are adapted for sealing engagement with said first and second shoulders on said movable member.

29. The apparatus of claim 28 wherein at least one of said flanges is defined by a sealant ring carried by said ring-like member.

30. The apparatus of claim 27 wherein said ring-like member is sealingly accommodated within said filler neck.

31. The apparatus of claim 25 wherein said spool-like body includes sealant means arranged in combination with said opening for accommodating and snugly fitting about a pump nozzle.

32. In combination with a fluid container having a filler neck defining an inlet through which fluid is admitted into said container, a cap for closing and opening said inlet, vapor ventilation means including a nonrestricted vent port provided in said inlet for connecting the interior of said container with an enclosed chamber, and an apparatus for controlling vapor passage from said container during a filling process, said apparatus comprising:

an operative assembly arranged in said inlet to sealingly surround a liquid dispenser nozzle inserted into said inlet and through said operative assembly, said operative assembly being movable between a first position wherein it prevents communication between said container and said vapor ventilation means and a second position wherein it permits communication between said vapor ventilation means and said container, the position of said operative assembly being automatically controlled by said cap.

33. The apparatus of claim 32 wherein said operative assembly includes an elongated body member having axially spaced first and second shoulders and an axially extending opening therethrough.

34. The apparatus of claim 33 wherein said cap and said body member have interengaging elements which, when said cap is sufficiently rotated in one direction, causes said body member to be positionally arranged to close off said nonrestricted vent port from said container interior and which, when said cap is rotated in the opposite direction allows communication between said container interior and said enclosed chamber through said vent port.

35. The apparatus of claim 33 wherein said operative assembly further includes an annular apertured stationary member disposed between said first and second shoulders of said body member.

36. The apparatus of claim 35 wherein said annular member includes first and second flanges adapted for sealing engagement with said first and second shoulders on said body member.

37. The apparatus of claim 35 wherein said operative assembly includes valve assembly means disposed between said stationary member and said enclosed chamber for preventing liquid from being delivered to said chamber.

38. The apparatus of claim 37 wherein said operative assembly further includes a pressure relief valve provided in said stationary member.

39. The apparatus of claim 33 wherein said elongated body is endwise movable in said inlet.

40. The apparatus of claim 39 wherein said body is resiliently biased from one position to another when said cap opens said inlet.

* * * * *